Oct. 30, 1923.
C. H. BROWN
FISHING TOOL
Filed Oct. 29, 1921
1,472,713
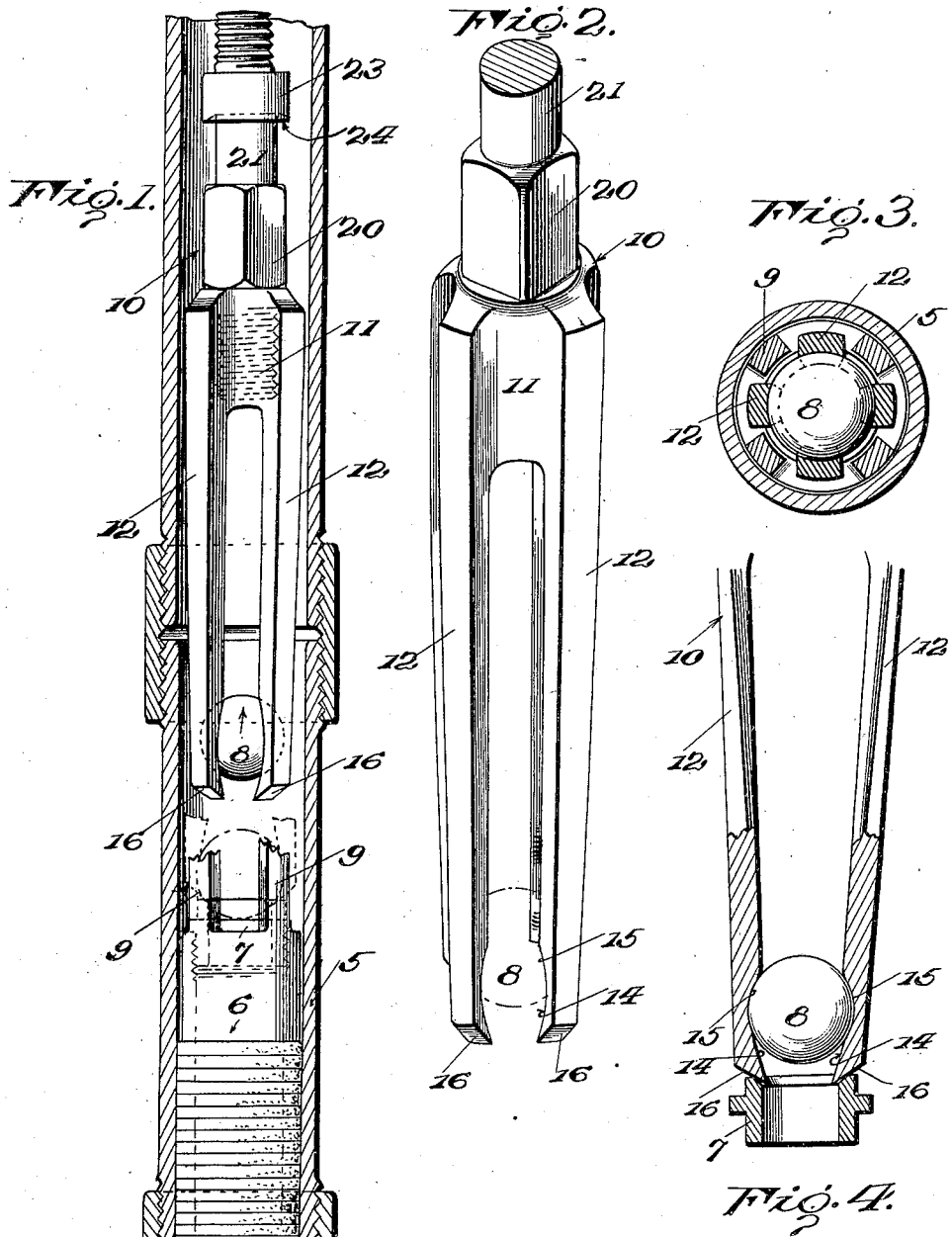

Patented Oct. 30, 1923.

1,472,713

UNITED STATES PATENT OFFICE.

CHARLES H. BROWN, OF BRECKENRIDGE, TEXAS.

FISHING TOOL.

Application filed October 29, 1921. Serial No. 511,367.

*To all whom it may concern:*

Be it known that I, CHARLES H. BROWN, a citizen of the United States, and a resident of Breckenridge, in the county of Stephens and State of Texas, have invented certain new and useful Improvements in Fishing Tools, of which the following is a specification.

This invention relates to fishing tools especially adapted for use in removing ball valves from oil wells.

An important object of this invention is to provide a fishing tool of the class described having novel means whereby the ball valve of a working valve may be jumped from its seat while under the load of oil or other liquid above the valve whereby the oil may be returned to the well and the valve freely removed.

Another object of the invention is to provide a fishing tool embodying a plurality of spring arms which converge toward their forward ends and are provided with ball receiving sockets on their inner sides into which the ball is extended upon being jumped from its seat by means of the wedge shaped terminal portions of the spring arms which are forced between the ball and the seat by a multiplicity of forces.

A further object of the invention is to provide a valve removing tool which is self centering, durable in use and cheap to manufacture.

Other objects and advantages of the invention will be apparent during the course of the following description.

In the accompanying drawing forming a part of this application and in which like numerals are employed to designate like parts throughout the same.

Figure 1 is a side elevation of the improved fishing tool in use, the same being shown within the working barrel of an oil well.

Figure 2 is a perspective of the improved tool.

Figure 3 is a horizontal sectional view through the tool in use, the spring arms being shown in engagement with the ball and between the bars of the valve cage.

Figure 4 is a fragmentary side elevation of the improved tool in use, parts being shown in section.

In the drawing wherein for the purpose of illustration is shown a preferred embodiment of the invention, the numeral 5 designates a working barrel in which is arranged a working valve 6 having an annular valve seat 7 upon which a ball valve 8 is seated. In this case the cage of the valve is shown as being broken and the bars 9 of the cage terminate slightly above the valve seat 7.

The tool forming the subject matter of this application is generally designated by the numeral 10 and consists of a head 11 provided with a plurality of converging spring arms 12 having means to grip the valve 8 and hold the same in an elevated position so that the oil above the valve may return to the well. The valve gripping and elevating means of the converging spring arms 12 jump the valve from its seat against the pressure of the column of oil, which column of oil in a 3,000' well exerts a pressure of approximately 500 lbs.

With reference to Figure 4 it will be seen that the forward ends of the arms have their inner sides provided with gradually deepened groove 14 which terminate in sockets 15 into which the ball valve 8 is extended upon being jumped from the seat 7. When the jars move the tool downwardly the forward ends of the spring arms 12 are engaged with the top of the valve 8 and are spread thereby so as to assume the full line position illustrated in Figure 4. The forward ends of the arms 12 are beveled to a point as indicated at 16 to provide wedges adapted to be inserted between the valve 8 and the valve seat. When the wedge shaped terminal portions of the arms 12 are inserted between the valve and the valve seat on the downward stroke of the jars the valve 8 will be jumped upwardly and the arms bent outwardly between their ends so as to facilitate the rearward movement of the ball valve and to permit the beveled faces 16 to slide inwardly on the valve seat 7. When the valve 8 is thus elevated the oil above the valve is readily returned to the well and the ball valve may be readily and conveniently removed.

More specifically when the beveled forward end portions of the arms 12 are wedged between the ball valve 8 and the valve seat 7 the arms 12 are bent outwardly intermediate their ends so that the ball may be jumped upwardly against the pressure of the column of oil and subsequently received in the sockets 15. That is to say by presenting the beveled forward ends of the arms 12 to the valve and the valve seat as illustrated in dotted lines in Figure 4 the valve can be forcibly jumped from its seat.

The beveled terminal portions of the arms 12 are effectively wedged between the ball valve 8 and the valve seat by the downward stroke of the jars and by the tendency of the terminal portions of the arms 12 to move inwardly due to the fact that they are spread outwardly beyond their normal positions. Further the bending of the arms 12 intermediate their ends causes the arms to exert a tendency to move together and thereby unseat the valve 8.

When the valve 8 has been unseated the working valve 6 may be removed by another tool which forms no part of this invention and which is provided with special means for gripping the working valve.

As illustrated in Figures 1 and 2 the rear end of the head 11 is provided with a squared portion 20 adapted to be engaged by the jaws of a wrench and which is provided with a stem 21. The stem 21 has threaded engagement with the jars which form an operating means for the tool. Intermediate the ends of the stem 21 the same is provided with an enlargement 23 which is undercut as indicated at 24 to provide a means whereby the same may be engaged by a fishing tool should the same become lost while in the well.

Having thus described the invention, what I claim is:—

1. A ball valve removing tool for wells comprising a head having a plurality of spring arms converging toward their forward portions and provided on their inner sides with gradually deepened grooves terminating in ball receiving sockets, said arms having means to jump the valve from its seat against the pressure of the column of oil above.

2. A ball valve removing tool comprising a head having a plurality of spring arms converging toward their forward portions and provided on their inner sides with gradually deepened grooves terminating in ball receiving sockets, the forward ends of said arms being beveled to points to define wedges adapted to be driven between the ball and the seat of the same whereby to jump the ball from the seat against the pressure of a column of oil above.

3. A ball valve removing tool for oil wells comprising a head having a plurality of spring arms converging toward their forward portions and having their forward portions provided with gradually deepened longitudinal grooves terminating in ball receiving sockets, the ends of said arms being beveled on their outer sides to define wedges adapted to be driven between the ball valve and the seat of the same whereby to forcibly jump the valve from its seat against the pressure of the column of oil above and to cause the valve to enter said sockets, and attaching means carried by said head, the intermediate portions of said spring arms being adapted to bend outwardly whereby the wedges are presented to the valve seat diagonally with respect to the longitudinal axis of the tool.

4. A ball valve removing tool for wells comprising a head having a plurality of spring arms, the forward portions of which are beveled outwardly to constitute wedges adapted to be driven between the ball valve and the seat thereof whereby to forcibly unseat the valve against the tension of the column of oil above, said spring arms being provided with means to hold the ball valve subsequent to the forcible unseating of the same

CHARLES H. BROWN.